(12) United States Patent
Podhrasky

(10) Patent No.: US 7,575,065 B1
(45) Date of Patent: Aug. 18, 2009

(54) METAL DETECTOR WITH EXCAVATION TOOL

(75) Inventor: Robert J. Podhrasky, Dallas, TX (US)

(73) Assignee: Garrett Electronics, Inc., Garland, TX (US)

( * ) Notice: Subject to any disclaimer, the term of this patent is extended or adjusted under 35 U.S.C. 154(b) by 1 day.

(21) Appl. No.: 12/183,150

(22) Filed: Jul. 31, 2008

(51) Int. Cl.
 *A01B 1/00* (2006.01)
 *A01B 49/00* (2006.01)
(52) U.S. Cl. ...................................... 172/438; 172/371
(58) Field of Classification Search .................. 37/405, 37/466, 468; 172/19, 21, 22, 25, 37, 371–378, 172/438; 15/339, 347, 352; 324/326, 67; 209/417, 55, 59, 119
 See application file for complete search history.

(56) References Cited

U.S. PATENT DOCUMENTS

| | | | |
|---|---|---|---|
| 3,316,545 A | | 4/1967 | Reed |
| 3,757,501 A | | 9/1973 | Bennett, Jr. et al. |
| D263,380 S | | 3/1982 | Hay |
| 4,359,686 A | | 11/1982 | Wherry |
| 4,600,356 A | | 7/1986 | Bridges et al. |
| 4,622,766 A | | 11/1986 | Hall |
| 4,983,281 A | | 1/1991 | Montelione |
| 5,097,211 A | | 3/1992 | Schonstedt |
| 5,771,530 A | * | 6/1998 | Rodriquez .................... 15/339 |
| D410,399 S | | 6/1999 | De Torfino |
| 6,041,940 A | | 3/2000 | Owings |
| D423,377 S | | 4/2000 | Atterbury et al. |
| D459,245 S | | 6/2002 | Power |
| D459,246 S | | 6/2002 | Power et al. |
| D497,559 S | | 10/2004 | Johnson |
| 6,957,506 B1 | | 10/2005 | Fair |
| D513,706 S | | 1/2006 | Johnson |
| 7,121,356 B2 | * | 10/2006 | Michael ....................... 172/371 |

OTHER PUBLICATIONS

Bullseye II Pinpointer handheld metal detector. Internet site: http://hobby.us.whiteselectronics.com/content/view/40/55.
Fisher F-Point Metal Detector. Internet site: http://www.detection.com/fisher/f-point.html.
Vibra-Probe 570 Pinpointer metal detector. Internet site: http://www.treasureproducts.com/vibraprobe.html.

* cited by examiner

*Primary Examiner*—Robert E Pezzuto
(74) *Attorney, Agent, or Firm*—Dan Brown Law Office; Daniel R. Brown

(57) ABSTRACT

A hand-held metal detector and soil excavation device useful for locating and retrieving metallic objects concealed in soil or other materials. The device includes a housing with a hand-grip portion and an elongated probe portion. There is an excavation tool connected to the housing that is useful for moving soil to locate metallic objects that are sought. The device also includes a metal detector circuit located within the housing, that operates to generate an alert signal when the probe portion is moved into proximity of metallic objects.

21 Claims, 6 Drawing Sheets

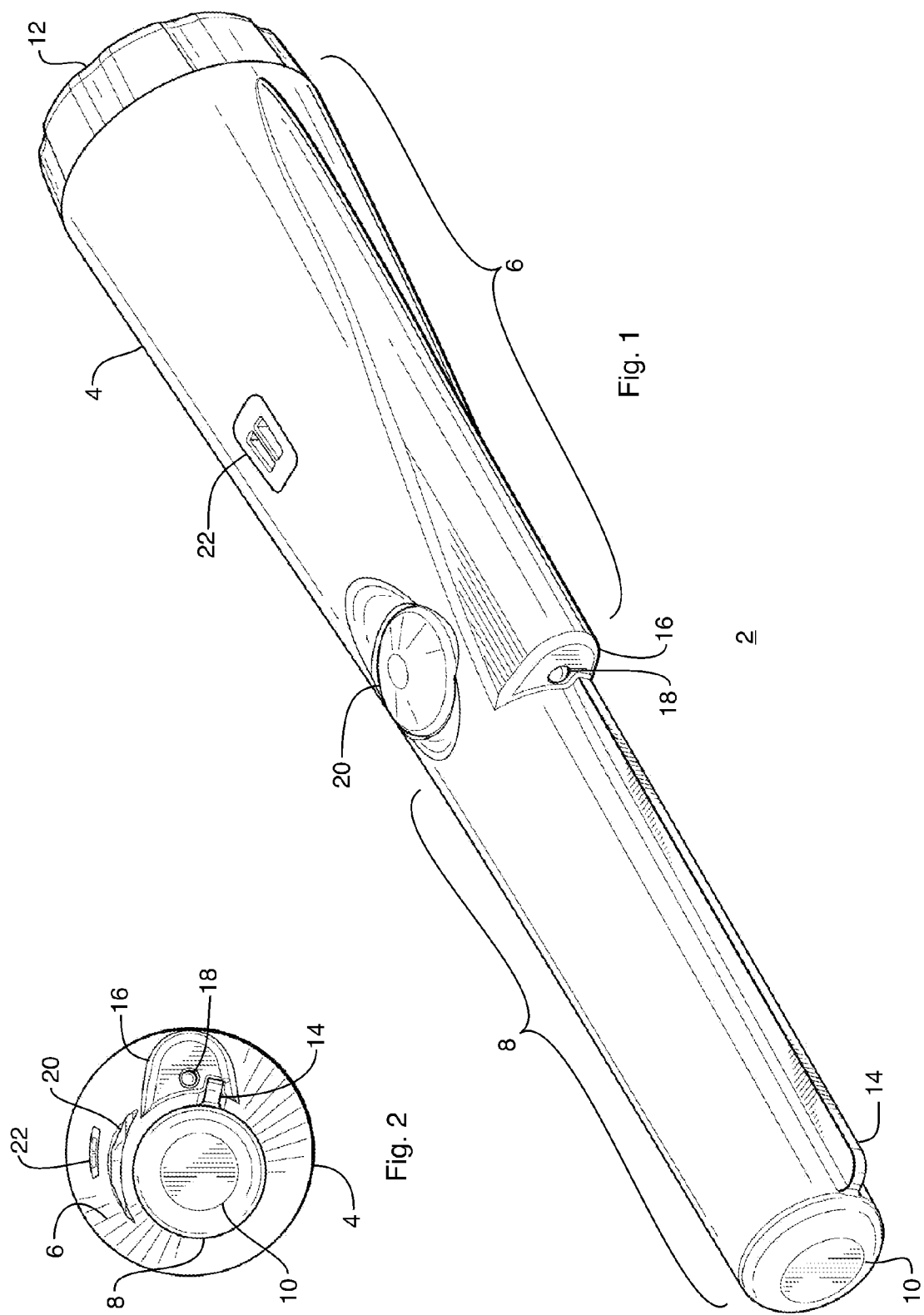

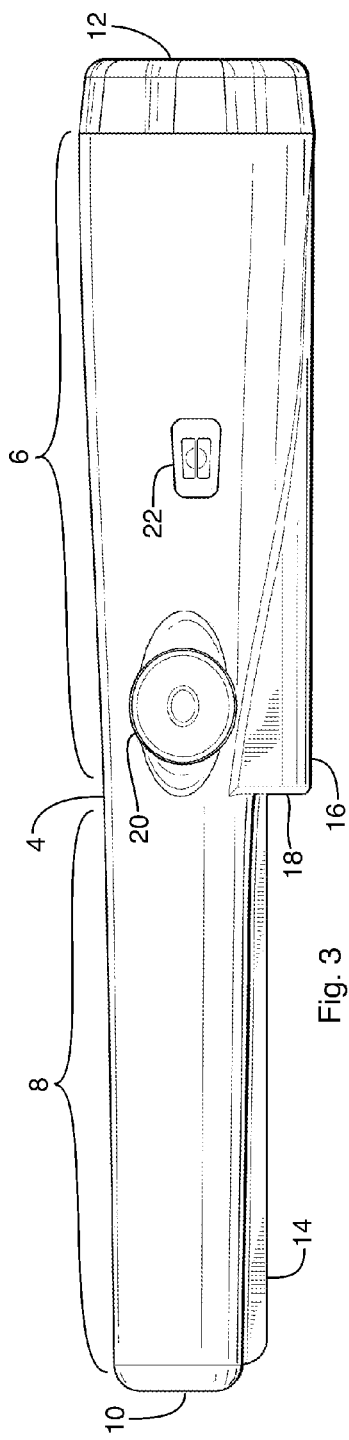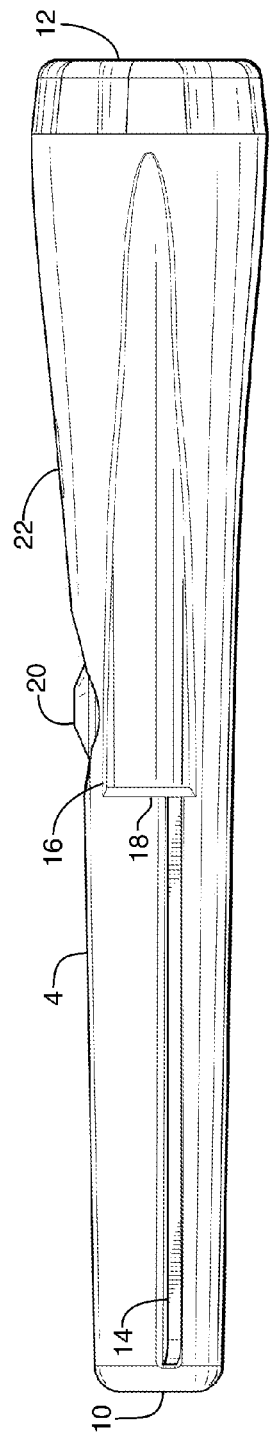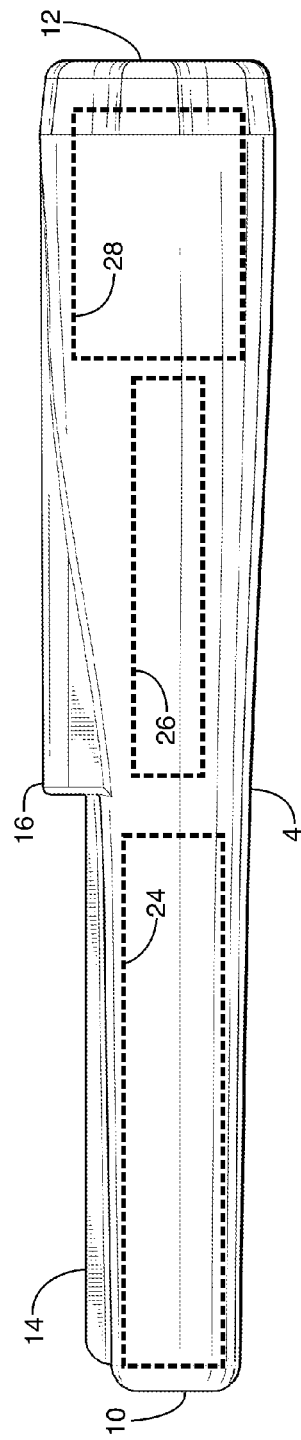

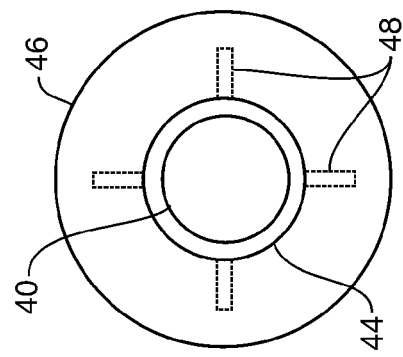
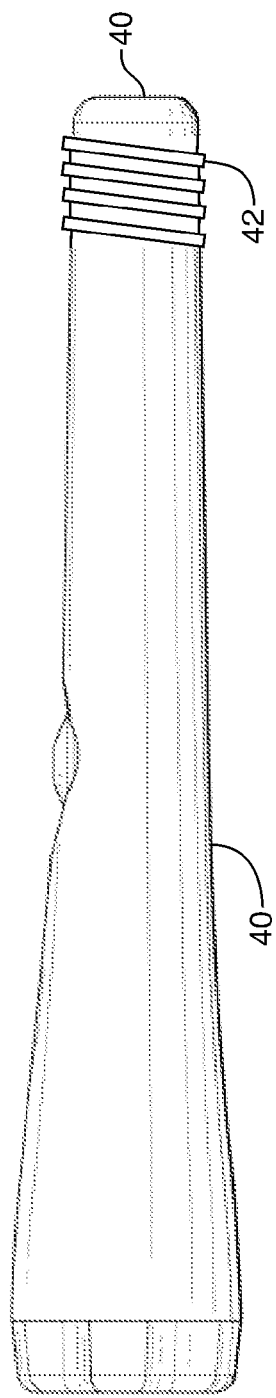
Fig. 10
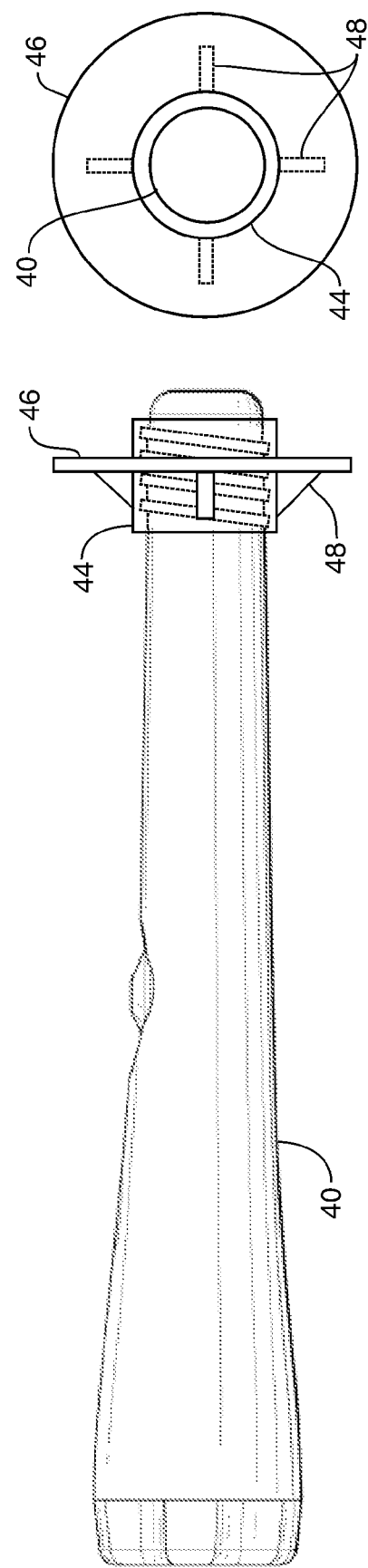
Fig. 9
Fig. 8

METAL DETECTOR WITH EXCAVATION TOOL

BACKGROUND OF THE INVENTION

1. Field of the Invention

The present invention relates to metal detectors. More specifically, the present invention relates to a hand-held metal detector having an excavation tool.

2. Description of the Related Art

Metal detectors have been widely used for hobby, commercial, and security application for many decades. The modern metal detector consists of one or more search coils coupled to a detector circuit, which in turn, is connected to a user interface that reports the detection and presence of metallic objects to the operator. The search coil(s) establishes an electromagnetic field, called a search field, which can effectively penetrate non-metallic materials, such as soil, water and other materials. When the search field is moved into proximity of a metallic object, the field is disturbed and the detector circuit senses this disturbance. Those skilled in the art are familiar with a number of field establishing and field disturbance detecting techniques, which can be used to estimate the size, location, and the content of the metallic objects in question. There are certain correlations between the search field and the search coil. Generally, a larger coil produces a larger field, and this enables deeper penetration by the field. However, there is a trade-off in that a larger search field provides a less accurate determination of the specific location of the target metallic object. Specialized coils have been devised that yield uniquely shaped search fields in an attempt to achieve deep penetration and accurate location. Nonetheless, a performance trade off exists between field penetration and metallic object location accuracy.

A common application for metal detectors is treasure hunting by hobbyists. Desirable target metallic objects sought by hobbyists are coins, jewelry, artifacts, and other treasure, for example. Given a relatively large search area, such as a public park for example, hobbyists will typically select a ground search metal detector that is effective for sweeping, or scanning, a large area with good field search field penetration depth. Good penetration for small objects would be approximately six to twelve inches. A ground search metal detector typically employs a relatively large search coil (perhaps six to twelve inches in diameter) that is sequentially scanned back and forth, about one or two inches above the ground surface. To facilitate the user interface, a stem is usually employed to support the search coil and reach upwardly to a comfortable height for the user to carry the metal detector while standing and scanning the ground. The stem also supports the detector circuit and user interface at a comfortable position, and may include various handles and arm rests for user comfort.

During a treasure hunt using a ground search metal detector, a fortunate hobbyist may receive and alert from the metal detector indicating that a metallic object has been located. The next step is to dig into the soil and retrieve the treasure. Off course, many times it is not real treasure, but merely other metallic debris, such as bottle caps, foils wads and so forth. Thus, treasure hunting with a metal detector is a repetitive task. As a practical matter, it is not necessarily easy or trivial to retrieve the metallic object discovered using a ground search metal detector. The user is faced with the task of digging a six to twelve in hole that is six to twelve inches deep for each alert that the metal detector provides. This issue has been alleviated to a certain degree through utilization of a second smaller coil or even a second metal detector that has a much smaller detection coil to scan the area identified by the larger coil on the ground search metal detector. This procedure is helpful to a degree, however, the smaller coil will not penetrate as deeply, so the user may have to scan, then dig, then scan again, etc. etc. Additionally, a typical user will not dig into the soil with his bare hands, but rather carry some sort of tool to assist in the digging operation. The user may have a ground search detector, a smaller detector, and one or more digging tools to manage during a treasure hunt. Thus it can be appreciated that there is a need in the art for an apparatus and method to assist a metal detector user in locating and retrieving a metallic objects that are concealed in soil or other material.

SUMMARY OF THE INVENTION

The need in the art is addressed by the devices and methods of the present invention. The present invention teaches a hand-held metal detector and soil excavation device useful for locating and retrieving metallic objects concealed in soil or other materials. The device includes a housing with a hand-grip portion and an elongated probe portion. There is an excavation tool connected to the housing that is useful for moving soil to locate metallic objects that are sought. The device also includes a metal detector circuit located within the housing, that operates to generate an alert signal when the probe portion is moved into proximity of metallic objects.

In a specific embodiment of the foregoing device, the excavation tool is a blade that is fixed to a side of the elongated probe portion of the housing. In another embodiment, the excavation tool is releasably connected to the housing. In another embodiment, the excavation tool is threadably connected about a tip end of the elongated probe portion. In another embodiment, the excavation tool has the form of a trowel. In another embodiment, the excavation tool has the form of a rake. In another embodiment, the excavation tool has the form of a hoe.

In a specific embodiment, the foregoing device also includes an actuator disposed on the hand-grip portion of the housing that operates to selectively activate the metal detector circuit. In another specific embodiment, the foregoing device also includes a light disposed upon the housing that is aligned to illuminate an area adjacent to a tip end of the elongated probe portion of the housing, and, the light is selectively illuminated upon actuation of the actuator. In a refinement to this embodiment, the light is coupled to the metal detector circuit, and the alert signal is a visible alert output using the light.

In a specific embodiment, the foregoing device further includes an audio transducer coupled to the metal detector circuit, and the alert signal is an audio alert signal that is output using the audio transducer. In another embodiment, the device includes a tactile transducer coupled to the metal detector circuit, and the alert signal is a tactile alert signal output using the tactile transducer. In another specific embodiment, the metal detector circuit includes a search coil disposed within the elongated probe portion of the housing that generates a search field along a side of the probe, and, the excavation tool is aligned with the search field.

The present invention also teaches a method of locating and retrieving metallic objects concealed in soil or other materials using a hand-held metal detector that has a housing with a hand grip portion and an elongated probe portion, the housing also has an excavation tool connected to it, and, has a metal detector circuit disposed within it. The method includes the steps of scanning an area of soil with the hand-held metal detector in search of metallic objects, and generating an alert signal when the probe portion is within proximity of a metallic object. Then, moving soil with the excavating tool to locate the metallic object, and retrieving the metallic object from the soil.

In a specific embodiment of the foregoing method, wherein the excavation tool is a blade fixed to the side of the elongated probe portion, the moving step further includes scraping soil with the blade. In another embodiment, wherein the excavation tool is a trowel, the moving step further includes digging soil with the trowel. In another embodiment, wherein the excavation tool is a rake, the moving step further includes raking soil with the rake. In another embodiment, wherein the excavation tool is a hoe, the moving step further includes hoeing soil with the hoe.

In a specific embodiment of the foregoing method, wherein the excavation tool is releasably connected to housing, the step of attaching the excavation tool to the housing is added. In another specific embodiment of the method, wherein the hand-held metal detector includes a light disposed on the housing, the step of illuminating an area adjacent to a tip end of the elongated probe portion with the light is added.

BRIEF DESCRIPTION OF THE DRAWINGS

FIG. 1 is a perspective drawing of a hand-held metal detector according to an illustrative embodiment of the present invention.

FIG. 2 is an end view drawing of a hand-held metal detector according to an illustrative embodiment of the present invention.

FIG. 3 is a front view drawing of a hand-held metal detector according to an illustrative embodiment of the present invention.

FIG. 4 is a side view drawing of a hand-held metal detector according to an illustrative embodiment of the present invention.

FIG. 5 is a back view drawing of a hand-held metal detector according to an illustrative embodiment of the present invention.

FIG. 8 is a side view drawing of a hand-held metal detector according to an illustrative embodiment of the present invention.

FIG. 9 is an end view drawing of a hand-held metal detector according to an illustrative embodiment of the present invention.

FIG. 10 is a side view drawing of a hand-held metal detector according to an illustrative embodiment of the present invention.

DESCRIPTION OF THE INVENTION

Figure 6:
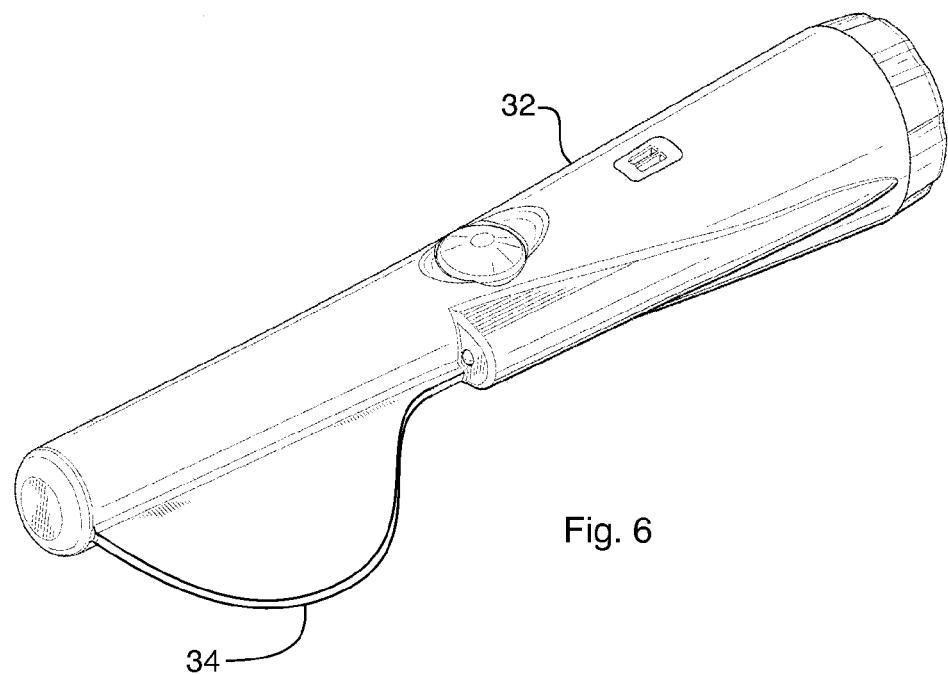
FIG. 6 is a perspective view drawing of a hand-held metal detector according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The problem in the art is addressed by the teachings presented herein. Various illustrative embodiments are described, and those of ordinary skill in the art will envision variants and modifications to the presented embodiments that are consistent with the claims appended hereto. One embodiment is a hand-held metal detector designed to precisely pinpoint metallic, both ferrous and nonferrous, objects sought during treasure recovery efforts. Although many other useful applications for metal detection exist as well. The hand-held metal detector embodiment is useful in conjunction with ground search metal detectors to aid in recovery of metallic targets and other metallic objects. The illustrative embodiment provides both audible and vibrating, or tactile, alarms to indicate the presence of metal objects. The alarms increase in intensity as the hand-held metal detector is moved into closer proximity to a metallic target. A sifting and scraping blade, which serves as an excavating tool, is disposed along the side of an elongated search probe portion of the detector. The search coil contained in the probe has a side-scan capability, so that metal objects can be detected and an alert sounded during the soil excavating operations, in addition to sounding the alert during pin-pointing detection where the tip of the probe is directed toward the metallic object. In addition, a light emitting diode light is disposed on the detector housing and directed toward the search area to aid in low-light and no-light visibility.

Reference is directed to FIG. 1, which is a perspective drawing of a hand-held metal detector 2 according to an illustrative embodiment of the present invention. The detector 2 is contained in a non-metallic housing 4 that consists of two primary portions, including a hand-grip portion 6 and an elongated probe portion 8. The hand-grip portion 6 is adapted for convenient hand holding, and includes a power and detection switch actuator 20 and an audio alert transducer 22. In addition a tactile, vibrating, transducer (not shown) is contained within the housing 4, and can be sensed by a user holding the hand-grip portion 6 during operation. A battery cover 12 threadably engages the hand-grip end of the housing 4, and provides access for installing and replacing a nine-volt battery that powers the detecting circuitry inside the housing 4. A housing protrusion 16 extends from the hand-grip portion 6, and supports an LED light 18 that is directed toward the metallic target search and excavation area during operation of the detector 2. The elongated probe portion 8 of the housing 4 has a tip end 10, which produces the highest sensitivity search field during operation of the detector 2. A sifting and scraping blade 14 is contiguously formed along a side of the elongated probe portion 8. An electromagnetic search coil (not shown) is disposed within the elongated probe portion 8, which generates an electromagnetic search field during operation. The search field is most sensitive at the tip end 10 of the probe 8, but is also usefully sensitive along the side of the probe 8 in the area of the blade 14. Using this arrangement, the user has sensitive metal detection at the tip end 10 during probing operations, and also has detection capability during excavating operations.

Reference is directed to FIG. 2, which is an end view drawing of a hand-held metal detector according to an illustrative embodiment of the present invention. FIG. 2 corresponds to the hand-held metal detector of FIG. 1. FIG. 2 illustrates the circular profile of the detector. The tip end 10 is round and concentric with the elongated probe portion 8, which is slightly tapered. The excavating tool blade 14 is illustrated to show its orientation with the probe 8 and the LED light 18 supported in the protrusion 16 of the hand-grip portion 6 of housing 4. Note that the LED 18 illuminates a path along the blade 14 toward the tip 10 such that the user has useful illumination during both probing and excavating operations. The LED 18 is illuminated coincidentally with operation of the detector circuitry. The power switch actuator 20 is actuated a first time to activate the detector circuit and illuminate the LED 18, and actuated a second time to deactivate the detection circuit and extinguish the LED 18. The audio transducer port 22 is also visible in FIG. 2. In the illustrative embodiment, the housing 4 is injection molded from a suitable thermoplastic material, as are known to those skilled in the art. In particular, housing material may be high impact ABS (acrylonitrile-butadiene-styrene) plastic resin. Suitable alternative materials include polyamide (nylon), ABS/polycarbonate blends, or a polycarbonate/polyester blend.

Reference is directed to FIG. 3 and FIG. 4, which are a front view drawing and a side view drawing of a hand-held metal detector according to an illustrative embodiment of the present invention. FIG. 3 and FIG. 4 correspond to the illustrative embodiment of FIG. 1. The arrangement of the hand-held metal detector housing 4 is further detailed in FIG. 3 and FIG. 4. The battery cover 12 threadably engages the hand-grip portion 6, which includes the audio transducer port 22 and the power switch actuator 20. In addition, the LED light 18 support protrusion 16 extends from the hand-grip portion 6. Those skilled in the art will appreciate that the hand-grip portion can be configured an a wide variety of shapes depending on material, style and other design considerations. The essential aspect is that it be adapted for hand-held use and be connected to the elongated probe portion 8. The elongated probe portion 8 extends from the hand-grip portion. In the illustrative embodiment, the excavating tool 14 is formed contiguous along a side of the elongated probe, however the excavation tool can also be supported by the hand-grip portion 6 of any other part of the housing 4.

Reference is directed to FIG. 5, which is a back view drawing of a hand-held metal detector according to an illustrative embodiment of the present invention. FIG. 5 corresponds to FIG. 3 and FIG. 4, however some of the internal components are illustrated in phantom in FIG. 5. The battery 28 is illustrated underneath the battery cover 12. The electromagnetic search coil 24 is illustrated within the elongated probe 8. The search coil consists of a lacquer coated copper wire coil wound onto a ferrite rod. The detector circuit 26 is also illustrated in FIG. 5. The battery 28 and search coil 24 in combination with a detector circuit 26, together with the aforementioned user interface items, comprise the metal detector operational components.

Reference is directed to FIG. 6, which is a perspective drawing of a hand-held metal detector according to an illustrative embodiment of the present invention. The hand-held metal detector housing 32 is generally configured, as in the prior embodiments, with a hand-grip portion and a probe portion. The excavating tool 34 is connected to the housing 32 using a contiguous molding process to provide a hoe-shaped tool for digging, scraping, and otherwise rearranging soil or other materials to reveal a target metallic object. In addition to contiguous molding, the excavating tool 34 may be releasable engaged to the housing 32 using a tongue and groove arrangement, interlocking members, fasteners or other connection means, which are known to those skilled in the art. Various excavation tool shapes are contemplated, and may be adapted in configuration depending upon the type of material or soil that conceals the target metallic object. Common hand-held gardening tool configurations can be adapted to the hand-held metal detector of the present invention, including but are not limited to, blades, probes, trowels, cultivators, rakes, spades, shovels, cultivators, and weeders. The excavation tool 34 in FIG. 6 is suitable for damp and loose soils, which can be moved and arranged in relatively large quantities by a hand-held tool. The blade configuration tool of FIGS. 1-5 is suitable to general uses, including densely packed and hard soils and the like.

Figure 7:
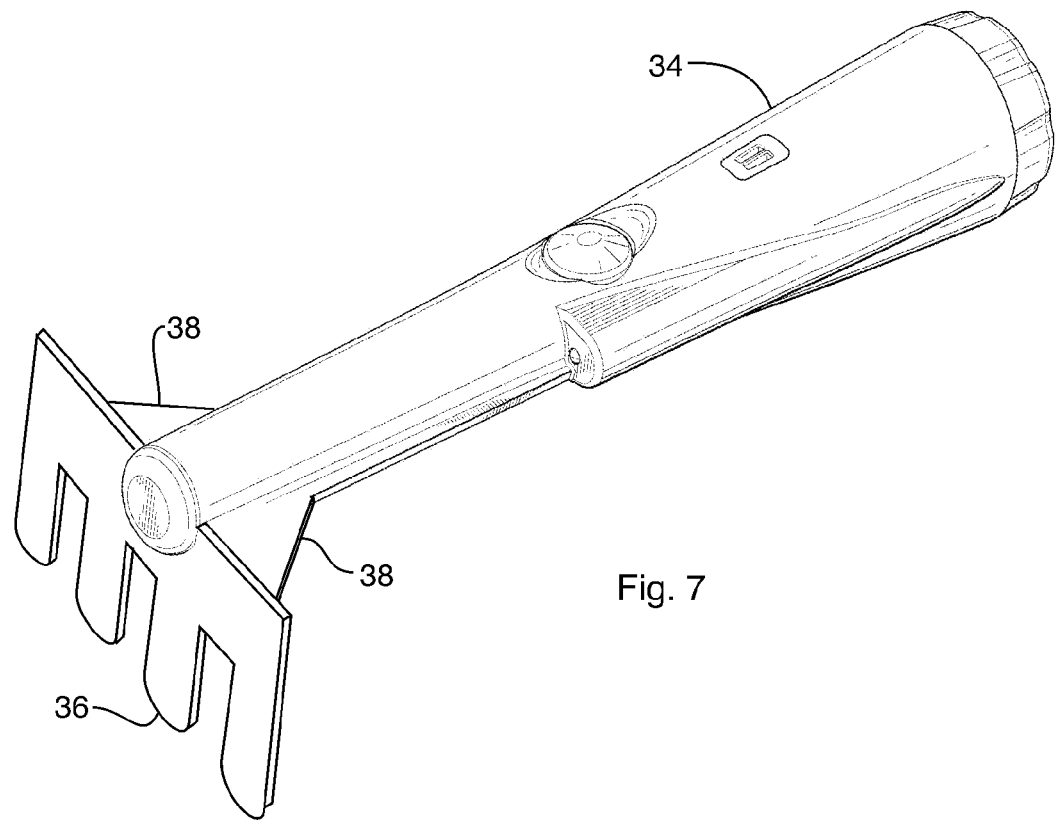
FIG. 7 is a perspective view drawing of a hand-held metal detector according to an illustrative embodiment of the present invention.

Reference is directed to FIG. 7, which is a perspective drawing of a hand-held metal detector according to an illustrative embodiment of the present invention. The hand-held metal detector housing 34 of FIG. 7 has a excavation tool 36 formed as a rake at the elongated probe tip end of the housing 34. The rake 36 is perpendicular to the length of the housing 34, so reinforcing gussets 38 are added for strength. The rake configuration of FIG. 7 is suitable for search for metallic objects concealed in lightly compacted and loose material and soils.

Reference is directed to FIG. 8, FIG. 9, and FIG. 10, which are side views and an end view drawing of a hand-held metal detector according to an illustrative embodiment of the present invention. The illustrative embodiment in these drawing figures present an alternative design that provides added flexibility and enables the use of replaceable excavating tools. By enabling the use of replaceable excavation tools, so the user can select a cultivating tool appropriate for the particular type of soil or material in which a treasure search is conducted. In addition, a worn or broken excavation tool can be readily replaced as needed. Also, the excavation tool can be removed completely, so that the hand-held metal detector can be used for other functions that do not required an excavation process, such as locating pipes or wiring in a building structure, etc. The hand-held metal detector housing 40 in FIGS. 8-10 includes a threaded section 42 at the elongated probe tip end 40 of the housing. An excavation tool 46 comprises a corresponding threaded section to releasably engage the threaded section 42 on the housing 40. In the illustrative embodiment, the excavation tool is formed as a digging disc 46 that is connected to a threaded hub 44 supported by plural gussets 48 to provided added strength. Any of the aforementioned excavating tools could be adapted to this embodiment, as well as other suitable excavating tool shapes.

Figure 11:
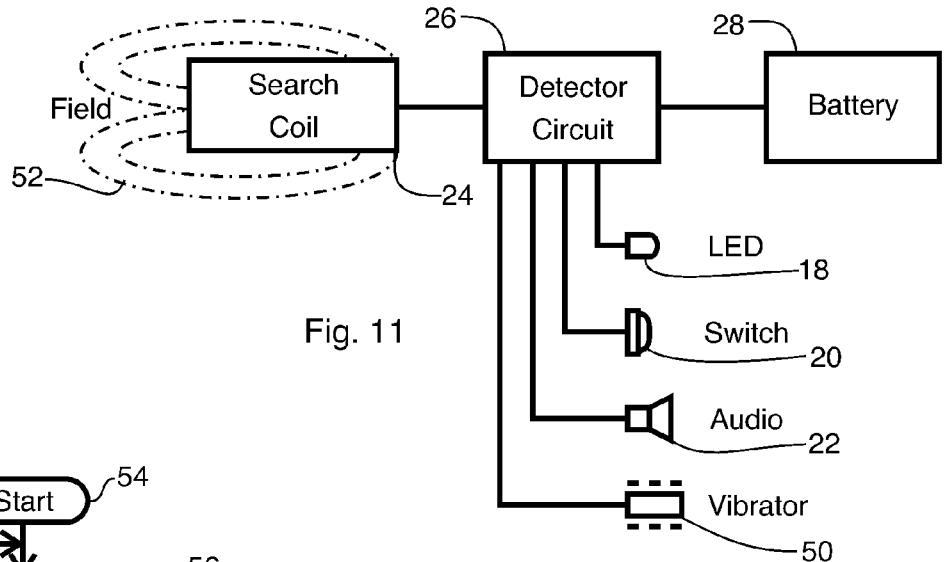
FIG. 11 is a functional block diagram of a hand-held metal detector according to an illustrative embodiment of the present invention.

Reference is directed to FIG. 11, which is a functional block diagram of a hand-held metal detector according to an illustrative embodiment of the present invention. The search coil 24, which is disposed within the elongated probe portion of the hand-held metal detector housing of the illustrative embodiments, produces an electromagnetic search field 52 about the side of the coil 24, as well as a concentrated field out the tip end of the elongated probe. This arrangement enables a concentrated search at the tip end of the probe, as well as a side search mode useful while excavation operations are underway. The search coil 24 is coupled to a detector circuit, which are known to those skilled in the art. An electric storage battery 28, such as a nine-volt battery, provides electrical power to the detector circuit 26. A switch actuator 20 controls power to the detector circuit 26. In the illustrative embodiments, the switch 20 operates by pressing a first time to activate power, and pressing a second time to deactivate power. The switch 20 could also be a momentary contact switch, or other suitable switch, as are known to those skilled in the art. The LED light 18 is coupled to the detector circuit 26, such that the LED is illuminated at any time the detector circuit 26 is powered. Alternatively, the LED light 18 could be powered through use of a separate switch actuator.

When a metallic object moves within the threshold of the magnetic field 52, the detector circuit 26 produces an alert signal. The alert signal changes in intensity and urgency as the metallic object moves closer to the search coil, indicated by an increased field disruption. This change manifests as an increasing tempo in the alert signal output. The alert signal is output to an audio transducer 22 and a motor-vibrator 50. The audio transducer 22 produces a beeping signal that increases in rate as the detection signal increases in intensity. Similarly, the motor-vibrator 50 pulses at a rate that increases with the alert signal's increased intensity.

Figure 12:
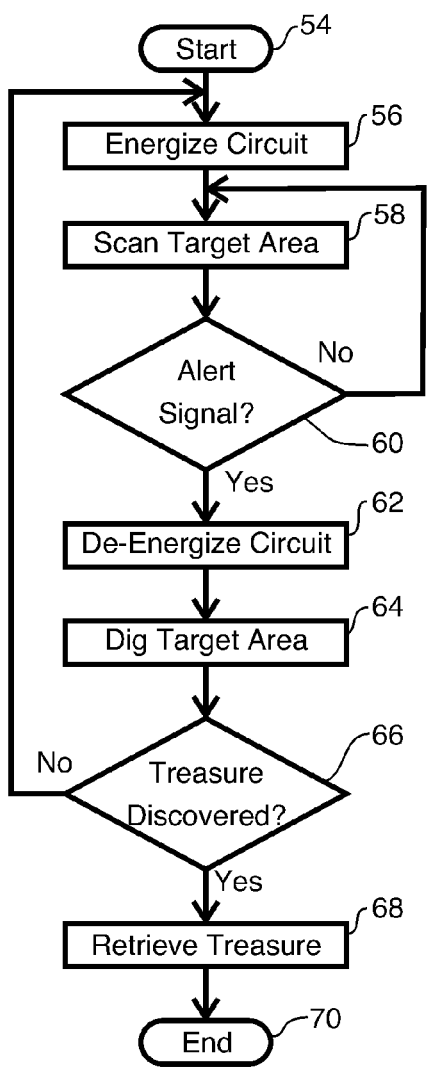
FIG. 12 is a process flow diagram of a hand-held metal detector according to an illustrative embodiment of the present invention.

Reference is directed to FIG. 12, which is a process flow diagram for a hand-held metal detector according to an illustrative embodiment of the present invention. The process in FIG. 12 illustrates the operation of the hand-held metal detector. The process begins at step 54, and proceeds to step 56 where the user energizes the metal detector circuit by actuating the power actuator switch. The user then scans a target area at step 58, seeking a metallic object that may be obscured by soil or other material. At step 60, an alert signal may be produced if a target metallic object enters the field of the metal detector. The alert signal intensity is proportional to the proximity and size of the object. The user naturally homes-in on the target. At step 62, the user may optionally de-energize the circuit to save battery power. On the other hand, the user may leave the circuit energized to take advantage of the aforementioned side-search capability of the hand-held metal detector during the excavation process. At step 64, the excavation tool is used to dig and move soil or material in the target search area. If the target treasure is revealed at step 66, then the user retrieves the treasure at step 68 and the search is completed at step 70. On the other hand, at step 66, if the treasure is not discovered, then the process returns to step 56 to re-energize the circuit, if needed, and continues the scan process at step 58 and 60.

Figure 13:
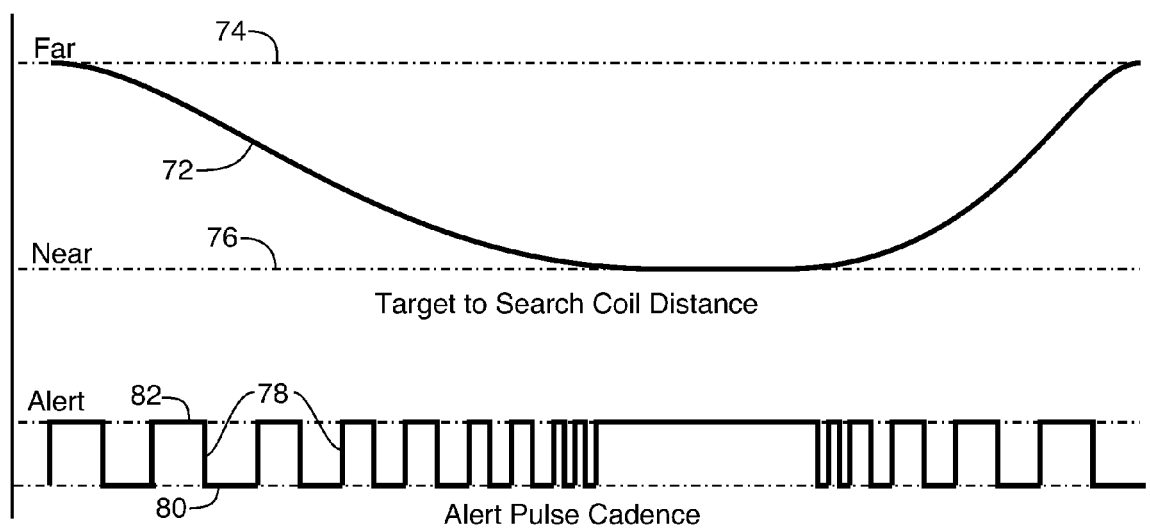
FIG. 13 is an alert timing diagram for a hand-held metal detector according to an illustrative embodiment of the present invention.

Reference is directed to FIG. 13, which is an alert timing diagram for a hand-held metal detector according to an illustrative embodiment of the present invention. The search coil and detector circuit of the illustrative embodiment are operable to produce a detection signal that is proportional to the distance between the search coil and the target metallic object. This is useful information to the user of the hand-held metal detector as it aids in quickly locating the desired target. The alert signal of the illustrative embodiment is proportional to the detection signal. Note that there are a number of techniques for altering an alert signal in proportion to the detection signal. For example, the volume of an audio alert could be increased, or the tone frequency altered in proportion to the detection signal. Such approaches are somewhat problematic, however. With respect to varying the volume, the effectiveness is highly dependent upon the ambient noise, which varies widely in the practical world. Similarly, varying frequency requires an acoustic transducer that is functional across a range of frequencies. Varying the alert level in a tactile transducer is event more problematic. The present invention address these issue through application of a variable pulse alert signal, that is equally effective for use with audible, tactile and visible alert transducers. The use of a pulsed alert signal enables the effective use of a single frequency, single volume audio transducer and a single frequency and magnitude tactile vibrator. In FIG. 13, the detection signal 72 is proportional to the distance between the search coil and the target metallic object between a "Far" distance 74 and a "Near" distance 76. The alert signal is output from the detection circuit as a stream, or train, of pulses 78 that vary between an off condition 80 and an on condition 82. For more distant objects the proportional audio indication is generated with an approximate 2 kHz audio signal which is gated at a 50% duty cycle at repetition rates of approximately 6 Hz for an object at a greater distance ("FAR"), increasing to 30 Hz for the same object at a closer distance ("Near"). Even closer proximity results in a steady 2 kHz tone. The vibrator is pulsed with the same 50% duty cycle at the 6 Hz to 30 Hz rate before remaining on when the target is very near. Thus, the user can both hear and tactically feel the varying intensity of the detection signal.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A hand-held metal detector and excavation apparatus for locating and retrieving a metallic object concealed in soil or other similar non-metallic material, comprising:

a housing with a common interior between a hand-grip portion that is proportioned for convenient hand holding and an elongated probe portion with a tip end;

an excavation tool connected to said housing for moving soil to locate the metallic object;

a metal detector circuit disposed within said hand-grip portion and said elongated probe portion, and having a search coil disposed within said elongated probe portion that is aligned to generate its most sensitive search field at said tip end, and operable to generate an alert signal when said probe portion is in proximity to the metallic object.

2. The apparatus of claim 1, and wherein said excavation tool is blade fixed to a side of said elongated probe portion.

3. The apparatus of claim 1, and wherein said excavation tool is releasably connected to said housing.

4. The apparatus of claim 1, and wherein said excavation tool is threadably connected about said tip end of said elongated probe portion.

5. The apparatus of claim 1, and wherein said excavation tool is a trowel.

6. The apparatus of claim 1, and wherein said excavation tool is a rake.

7. The apparatus of claim 1, and wherein said excavation tool is a hoe.

8. The apparatus of claim 1, further comprising:
an actuator disposed on said hand-grip portion operable to selectively activate said metal detector circuit.

9. The apparatus of claim 8, further comprising:
a light disposed upon said housing and aligned to illuminate an area adjacent to said tip end of said elongated probe portion, and wherein
said light is selectively illuminated by actuation of said actuator.

10. The apparatus of claim 9, and wherein:
said light is coupled to said metal detector circuit, and wherein
said alert signal is a visible alert output from said light.

11. The apparatus of claim 1, further comprising:
an audio transducer coupled to said metal detector circuit, and wherein
said alert signal is an audio alert signal output from said audio transducer.

12. The apparatus of claim 1, further comprising:
a tactile transducer coupled to said metal detector circuit, and wherein
said alert signal is a tactile alert signal output from said tactile transducer.

13. The apparatus of claim 1, and wherein:
said search coil further generates a search field along a side of said elongated probe portion, and wherein
said excavation tool is aligned with said search field along said side of said elongated probe.

14. The apparatus of claim 1, and where said alert signal is comprised of a stream of pulses that decreases in period in proportion to distance.

15. A method of locating and retrieving a metallic object concealed in soil or other similar non-metallic material using a hand-held metal detector having a housing with a common interior between a hand grip portion that is proportioned for convenient hand holding and an elongated probe portion with a tip end, the housing having an excavation tool connected thereto, and having a metal detector circuit disposed within the hand-grip portion and the elongated probe portion, wherein the metal detector circuit includes a search coil disposed within the elongated probe portion that is aligned to generate its most sensitive search field at the tip end, comprising the steps of:
scanning an area of soil with the hand-held metal detector in search of the metallic object;
generating an alert signal when the probe portion is within proximity of the metallic object;
moving soil with the excavating tool to locate the metallic object, and
retrieving the metallic object from the soil.

16. The method of claim 15, and wherein the excavation tool is a blade fixed to the side of the elongated probe portion, and wherein:
said moving step further comprises scraping soil with the blade.

17. The method of claim 15, and wherein the excavation tool is a trowel, and wherein:
said moving step further comprises digging soil with the trowel.

18. The method of claim 15, and wherein the excavation tool is a rake, and wherein:
said moving step further comprises raking soil with the rake.

19. The method of claim 15, and wherein the excavation tool is a hoe, and wherein:
said moving step further comprises hoeing soil with the hoe.

20. The method of claim 15, and wherein the excavation tool is releasably connected to housing, and further comprising the step of:
attaching the excavation tool to the housing.

21. The method of claim 15, and wherein the hand-held metal detector includes a light disposed on the housing, and further comprising the step of:
illuminating an area adjacent to a tip end of the elongated probe portion with the light.

* * * * *